United States Patent
Payne et al.

[11] Patent Number: 6,161,201
[45] Date of Patent: Dec. 12, 2000

[54] METHOD AND APPARATUS FOR CONCURRENT INTERACTION WITH A MODEM HAVING AN OPEN CONNECTION

[75] Inventors: Craig Payne; Jennifer Baker, both of Park City; Philip C. Garner, Farmington; Carl Ketcham, Taylorsville; John Major, Salt Lake City, all of Utah

[73] Assignee: 3COM Corporation, Santa Clara, Calif.

[21] Appl. No.: 09/031,102

[22] Filed: Feb. 26, 1998

[51] Int. Cl.[7] ................................................. G06F 11/273
[52] U.S. Cl. .......................... 714/43; 340/853.2; 375/222
[58] Field of Search ................................. 714/25, 43–47; 709/321, 328, 322, 324; 370/241; 455/557; 340/853.2; 375/222, 224

[56] References Cited

U.S. PATENT DOCUMENTS

| | | | |
|---|---|---|---|
| 4,419,751 | 12/1983 | Cholat-Namy et al. | 370/13 |
| 4,477,898 | 10/1984 | Cholat-Namy | 370/80 |
| 4,893,305 | 1/1990 | Fernandez et al. | 370/84 |
| 5,012,489 | 4/1991 | Burton et al. | 375/8 |
| 5,450,530 | 9/1995 | Snyder et al. | 375/220 |
| 5,675,831 | 10/1997 | Caputo | 395/830 |
| 5,687,222 | 11/1997 | McLaughlin et al. | 379/97 |
| 5,905,476 | 5/1999 | McLaughlin et al. | 345/1 |
| 5,940,383 | 8/1999 | Willkie | 370/336 |

*Primary Examiner*—Robert W. Beausoliel, Jr.
*Assistant Examiner*—Scott Baderman
*Attorney, Agent, or Firm*—Workman, Nydegger & Seeley

[57] ABSTRACT

A method and apparatus for a connection monitor to concurrently interact with a concurrent diagnostic-capable modem during an open connection controlled by a communication application without terminating the open connection between a host system and the modem. The connection monitor and a communication application operate concurrently to enable a user to interrogate a modem for status information while a connection with the modem remains open and functional with other communication applications. A serial device driver presents two types of entry to the operating system, one for normal communications and one for a collateral or side-door entrance from a connection monitor. The serial device driver multiplexes a packaged diagnostic command into the open channel with the data process by the serial driver and dispatched to a local modem. The local modem performs a demultiplexing function by routing traditional communication data to a traditional COM process and diagnostic information is routed to a diagnostic process. Diagnostic status information is likewise packaged and multiplexed into a data stream with traditional COM data information for dispatch to the serial device driver and demultiplexed therein. The inband diagnostic driver interfaces directly with the connection monitor via the operating system for returning the diagnostic status information as retrieved from the local modem. The present invention also provides a method and apparatus for obtaining remote status information from a remote modem by employing related processes.

19 Claims, 8 Drawing Sheets

METHOD AND APPARATUS FOR
CONCURRENT INTERACTION WITH A
MODEM HAVING AN OPEN CONNECTION

BACKGROUND OF THE INVENTION

1. The Field of the Invention

This invention relates generally to computer communication using a modem. More particular, the invention relates to concurrent interaction with a modem or any other communication device having an open connection for exchanging data between computers over a communication channel.

2. Present State of the Art

Digital processing devices such as computers have become more increasingly utilized in the exchange of communication information. Computers that were once autonomous computing entities are now typically interconnected with networks to process and exchange data. As transmitting computers and receiving computers may be remotely located one from another, a variety of communication channels or networks are employed to facilitate the routing of signals between the computers.

To facilitate the propagation of communication information across networks, computers interface with, or incorporate a modem to facilitate the electromagnetic propagation of communication information. In a transmitting role, a modem receives data in digital form from a host computer and couples or codes such data onto a propagatable waveform compatible with a specified network. Such a coupling process, commonly known as modulation, may vary in various characteristics that are commonly designated according to a transfer capacity measured in transitions or baud rates. A baud rate of a modem may change as a result of several factors, some of which include the rate carrying capacity of a network, the present noise levels associated with the communication channel and other parameters that require a modem to transmit data information at a reliable rate.

To facilitate the exchange of data between a host and a remote party, a communication application operating on a host system may provide a high level interface with a user of the host system and may also provide low level interfaces with hardware devices such as the modem. In FIG. 1, a prior art configuration of a host computer system interfacing with a modem for communication across a network via a communication channel is depicted. A communication application 10 interacts with an operating system 12 for facilitating the exchange of data and command information with a modem 24. Operating system 12, as depicted in FIG. 1, presents an exemplary operating system 12 such as, for example, Microsoft Windows 95®. Communication application 10 may take the form of common communication applications known by those of skill in the art which compatibly interface with the target operating system.

Communication application 10 interacts with operating system 12 through the use of an application programmer interface (API) 14 which exemplary utilizes a Win 32 API for interacting with the operating system. Alternatively, communication application 10 may interact directly with the hardware while bypassing interaction with the operating system. A specific API which is provided by an operating system vendor for interaction with communication devices is illustrated as a Win32 communications API 18 which provides a standardized set of services in a command structure form such as commands to configure, open and close a connection. The exemplary operating system 12 is further comprised of a serial driver 20, taking the form of a virtual device driver in the present example, for providing a bridge between the software associated with both communication application 10 and operating system 12 and the physical hardware illustrated as a serial communication port 22. Selection of a specific serial driver 20 may be determined by the corresponding hardware and software selections performed during a setup process when specific hardware and software drivers are configured.

Serial com port 22 interfaces directly with modem 24 over a dedicated link such as a serial link which traditionally takes the form of an RS-232 interface. Serial com port 22 traditionally interfaces with the host system via a bus such as an ISA, PC card or PCMCIA.

Serial com port 22 compatibly bridges a software execution and selection performed in communication application 10 with the configuration and processing performed by modem 24. As briefly described above, the data rates and configuration associated with modem 24 may be largely determined by characteristics such as the communication channel capability in addition to the capabilities of the remote or receiving modem. Due to the broad range of interfacing requirements, communication application 10 must properly configure modem 24 for compatible communication with a remote modem. In such a configuration or initialization process, a mode selector 26 resident within modem 24 selects an initialization mode or configuration mode commonly known as the AT mode represented in FIG. 1 as AT mode process 30. Such a mode provides general configuration control commands for modem 24.

In addition to control information, modem 24 is further comprised of status information denoting the present transfer speed and other various capabilities also known within modem 24. Both the modem, or any other communication device, and status are depicted as being stored within modem status/control 32 accessible by operating system 12 via AT mode process 30 when the mode selector 26 is directed or configured to be operating in the AT mode. Following completion of the setup or initialization process as carried out by AT mode process 30, mode selector 26 of modem 24 enables a traditional communication mode illustrated as traditional communication process 28. Data passing between the local host system and remote system pass through a data pump portion of modem 24 wherein data is physically modulated for transfer to a remote modem and received data is demodulated by the data pump within modem 24 for delivery to the communication application 10.

Upon the completion of the initialization process and the establishment of an open channel for transporting data information, data may be exchanged with a remote modem in a generally transparent fashion. However, when data rates appear to be less than desirable or when a user desires to have more control and insight into the status and operation of modem 24 with respect to the communication channel, the user may employ a diagnostic application such as a connection monitor 38 for interrogation of modem 24. While a user may desire to get status and control information from modem 24 while a connection is open, prior art implementations require the connection to be closed while connection monitor 38 issues an API 40 notifying modem 24 to revert to AT mode process 30 for extraction of modem status and control information. One such prior art solution employed the use of time-differentiated "+++" commands. Such a prior art approach transfers the modem from a communication process to AT mode process 30 by initiating a pause in the data transmission followed by the dispatch of a +++ representing an AT command followed by another pause for a specified period of time. Modem 24 recognizes such a pattern as an AT command request and toggles the mode from the communication process to the AT mode. Such a switching process introduces a significant amount of delay as it replicates an operator induced process. Such a delay may be upwards of several seconds thereby grossly impacting the throughput associated with the traditional communication process and skew the diagnostic results of interest.

Upon retrieving the requested status information from modem status/control 32, connection monitor 38 then asserts the appropriate commands to toggle the mode of modem 24 back to traditional communication process 28. Connection monitor 38 is then terminated and communication application 10 is reexecuted. Such a protracted switching operation greatly impacts the throughput associated with the transceiving of data information and communication application 38 may not be able to tolerate connection monitor 38 induced delays and will possibly fail in execution. Additionally, because of the significant impact to system performance, such a status query process may only be performed on an intermittent basis to preserve a tolerable throughput rate. Such an infrequent query of status information results in the diagnostic information available to the user becoming quickly outdated and stale thereby losing much of the status information's usefulness.

Other implementations or attempts to extract status or diagnostic information from a modem have resorted to incorporating diagnostic processes within the communication application. While such an approach may relieve the termination and reexecution processes associated with initiating and closing applications, such hybrid applications rely upon the utilization of mode switching commands including the aforementioned shortcomings. Furthermore, utilization of a hybrid communication/connection monitor restricts a user's preference in selecting a preferred communication application which may not include hybrid diagnostic capability and a separate connection monitor preferred by a user which may incorporate enhanced diagnostic features. That is to say, a hybrid communication/connection monitor does not enable a user to electically select preferred communication and connection monitors.

Thus, what is needed is a method and system for enabling a connection monitor to concurrently interact with a modem during an open connection controlled by a communication application without terminating the open connection of the modem or requiring the modem to switch to an initialization mode during such a diagnostic process. Furthermore, what is desired is a method and system for facilitating the concurrent operation of a communication application and a connection monitor and allowing both applications to access and communicate with a modem.

SUMMARY AND OBJECTS OF THE INVENTION

It is an object of the present invention to provide a method and system for facilitating the concurrent interaction of a connection monitor with a communication application during an open connection controlled by the communication application without terminating or affecting such an open connection established with the modem.

Another object of the present invention is to provide a method for a serial device driver, to facilitate a connection monitor to concurrently interact with a modem during an open connection controlled by a communication application without terminating the open connection with the modem.

Yet another object of the present invention is to provide a method for a serial device driver to concurrently receive communication commands from a communication application and connection monitor commands from a connection monitor into a single device driver while a connection between the serial device driver and a modem remains open.

A still further object of the present invention is to provide a method and apparatus for enabling a connection monitor to concurrently interact with the modem during an open connection controlled by a communication application and retrieve diagnostic information from a remote modem.

Additional objects and advantages of the invention will be set forth in the description which follows, and in part will be obvious from the description, or may be learned by the practice of the invention. These objects and advantages of the invention may be realized and obtained by means of the instruments and combinations particularly pointed out in the appended claims. To achieve the objects, and in accordance with the invention as embodied and broadly described herein, a method and system for enabling a user of a host system to concurrently interrogate a modem for status information and dispatch control information to the modem while a connection controlled by a separate application with the modem remains open is provided.

The present invention employs the use of an operating system, such as Windows 95® developed by Microsoft®, to provide an environment on a host system in which a communication application and a connection monitor may reside and execute for providing the corresponding functionality associated therewith. The operating system provides an application programming interface (API) for providing a bridge between custom applications and host system resources. In the present example, a communication application issues an API call to the operating system. The operating system interprets such commands and through the use of a serial device driver provides a bridging interface between the operating system and a serial COM port housing a hardware portion capable of interacting with a modem.

While prior art embodiments employed serial device drivers having a single interface point with the operating system, the present invention employs a serial device driver having a traditional serial driver for facilitating the transfer of data between a communication application and a modem and, in addition, incorporates an inband diagnostic driver having yet a separate interface to a connection monitor through the operating system. Such a configuration enables both the communication application and a connection monitor to concurrently interact with a serial device driver. To facilitate the single port interface between the serial device driver and the serial COM port, the serial device driver further incorporates a multiplexer function for merging serial data information with inband diagnostic information.

The merged information comprising serial data information and inband connection monitor commands is routed to a serial COM port for physical transmission to a modem device. The modem device upon receiving the merged information routes such information to internal processes or firmware for evaluation. The first step in the evaluation process of the merged information is to demultiplex or sort the merged information into the corresponding processes. The demultiplex function evaluates the stream of information and routes serial data information to a traditional COM process for processing by the data pump portion of the modem. In the preferred embodiment, the demultiplex process keys upon header information found in the data stream to identify a diagnostic command originating from a connection monitor. Such a diagnostic command is routed to an inband diagnostic process within the modem for evaluation.

When the diagnostic command requests status information from a modem's status/control store, the modem appropriately retrieves such status information while continuously maintaining the open connection supporting the exchange of data information between the host system and the modem.

The modem packages the status information into a diagnostic response command and employs a multiplexing function also within the modem, for integrating the packaged status response into a stream of data information destined for the host system from the modem. As in the received command request information, the diagnostic response is packaged using an identifiable header or other escape sequence techniques enabling the diagnostic response to be discerned by the host system. The integrated data information destined for the host system and the packaged diagnostic response are dispatched from the modem to the serial COM port for delivery to the serial device driver.

The serial device driver demultiplexes the received information into receive data information and a diagnostic response. The receive data information is processed by a serial driver within the serial device driver and appropriately routed to the communication application executing on the host system. The diagnostic response is processed by an inband diagnostic driver also resident within the serial device driver and dispatched through a collateral or side-door interface to a connection monitor. Such a partitioning of the serial device driver into a data information processing portion and an inband diagnostic processing portion enables single or multiple independent and separate connection monitor to interact with a likewise capable modem to retrieve status information and to dispatch control information thereto without requiring a change in status of the open connection, and hence, a substantial impact to the data throughput of the overall system. Alternatively, such a multiprocess configuration of a serial device driver does not require the integration of diagnostic functionality into a communication application thereby providing increased flexibility to a user in selecting a preferred communication application and a separate preferred connection monitor.

In an alternate embodiment, the connection monitor may request status information from a remote modem by generating a remote diagnostic status request command dispatched as described above to an inband diagnostic process within the local modem whereupon the local modem evaluates and determines that the diagnostic command is destined for a remote modem. The diagnostic process of the local modem thereupon forwards the remote diagnostic command to a multiplexing process for integration within the information stream passing through the open connection destined for the remote modem.

In a remote modem that is likewise capable of discerning inband connection monitor commands, a demultiplexing process separates data information from diagnostic information and passes the diagnostic information to a remote diagnostic process which carries out the requested command functionality. That is to say, when the remote diagnostic command designates a control operation, the diagnostic process in the remote modem performs the requested control function. Likewise, when the remote diagnostic command designates a remote status request, the remote diagnostic process retrieves the requested status information and packages such status information into an inband-recognizable format. The remote modem thereafter multiplexes the packaged remote diagnostic response into a stream of information destined for the local modem. Upon receipt of the information stream, the local modem evaluates the information and thereafter passes such information through the serial COM port to the serial device driver. The serial device driver demultiplexes the received serial data information from the received inband diagnostic response for individual processing. The remote diagnostic status response is thereafter forwarded to the connection monitor for utilization such as presentation to the user of the host system.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention embodies within its scope both methods and a system for facilitating the concurrent interaction of a connection monitor with a communication application during an open connection controlled by the communication application without terminating the open connection established with the modem. The purpose of the invention is to provide a means and method for enabling a user of a host system, such as a computer, to extract information from a modem during an open connection or direct control information to a modem during an open connection without requiring the communication application to be either terminated and the connection monitor initiated or without requiring a mode switching process that injects substantial performance degradation to data information passing through the communication application.

As used within this application the term "modem" refers to any modulation/demodulation configuration including a discrete modem having digital signal processing performed thereon and other modem configurations performing host signal processing within the host system such as a personal computer. Also, as used within this application, the term "host system" includes within its scope both computers and other processing devices including personal computers, embedded processors and the like. Furthermore, the term "operating system" implies within its scope a host-based system application for facilitating the interaction of user applications such as a communication application and connection monitor, with host system resources including software and hardware components.

Figure 1:
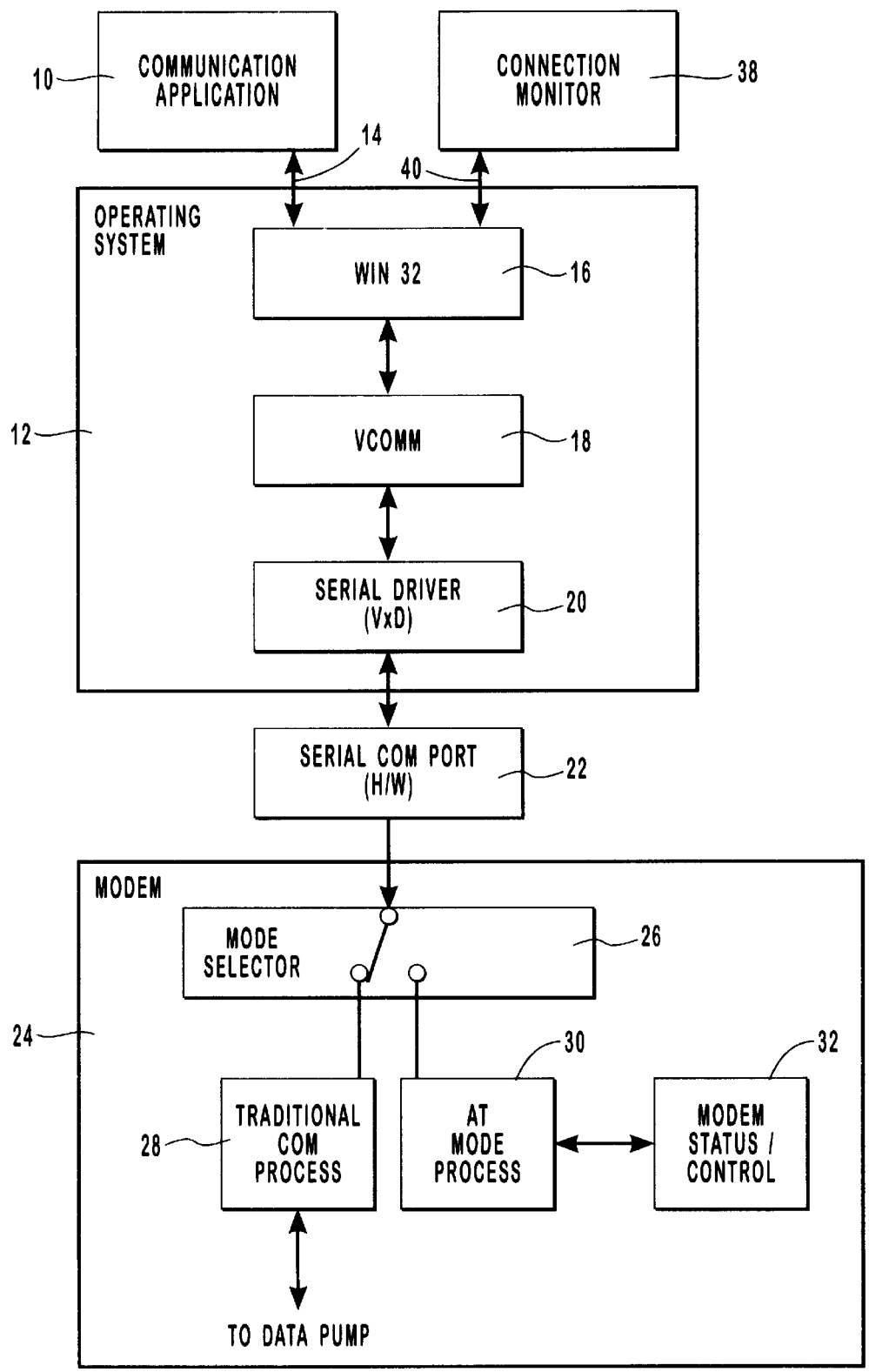
FIG. 1 is a simplified block diagram of a prior art approach for extracting status information and delivering control information to a modem.
Figure 2:
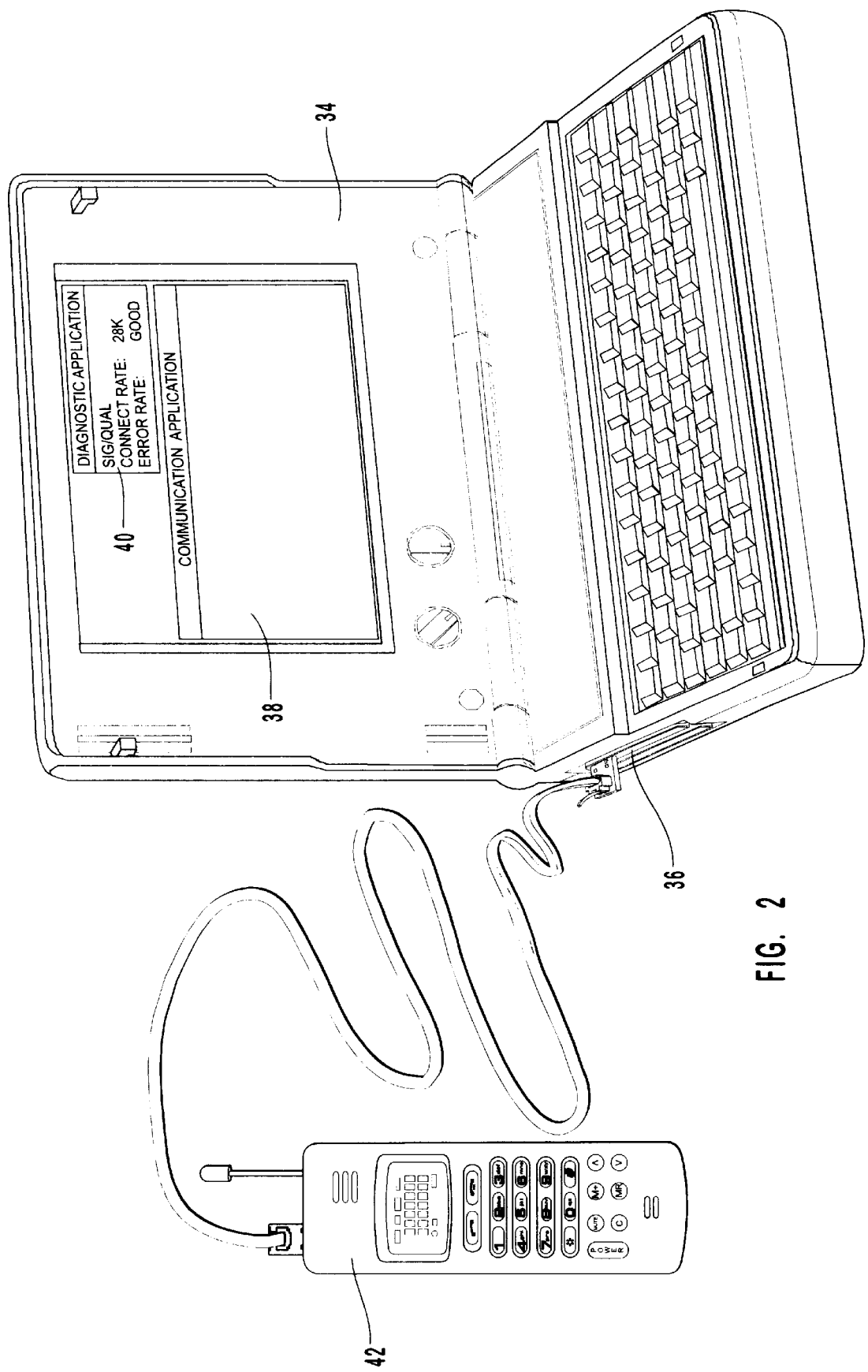
FIG. 2 depicts a simplified diagram of a communication application operating concurrently with a connection monitor for communicating with a modem while retaining an open connection, in accordance with the preferred embodiment of the present invention.

FIG. 2 depicts an environment wherein the invention may be practiced. A host system 34 provides an environment including an operating system capable of communicating data information with a remote party through the use of establishing a communication channel. Host system 34 facilitates the execution of a communication application 38 for establishing an open connection through which data information may be exchanged. Exemplary communication channels include custom and off-the-shelf products capable of retrieving, packaging, establishing an open connection through which data may pass and dispatching and receiving such data through the assistance of a modem 36.

Modem 36 couples to host system 34, in the preferred embodiment, through a host system interface such as a standard bus architecture including ISA, PCMCIA, CardBus and other system architectures known by those of skill in the art. As briefly described in the background portion above, modem 36 facilitates the transformation of data information having a digital form into a transmission format more suitable for electromagnetic propagation. While modem 36 is depicted as a device received internally to host system 34, other configurations placing modem 36 external to host system 34 such as external modems are also considered to be within the scope of the present invention. Furthermore, other modem-like devices are also considered to be within the scope of the present invention. Such devices include terminal adaptors as used in ISDN systems and other interfaces for adapting digital information with a wired or wireless communication channel.

FIG. 2 further depicts a wireless transceiver 42 coupled with modem 36 to provide a wireless communication channel through which data information may be exchanged. In the exemplary configuration, modem 36 may be comprised of further status information relevant to the quality and integrity of the communication channel as supported by wireless transceiver 42. In the exemplary wireless configuration, as well as in a wired embodiment, established communication parameters may vary as a result of several factors including a degeneration of the propagation path due to interference or other conditions, the routing of data information through less-capable communication devices. The availability of indicators quantifying the aforementioned factors facilitates the evaluation and diagnosis of such status conditions and enables proactive responses in the form of alterations to control parameters. A connection monitor 40, operating concurrently with communication application 38, may interrogate and direct modem 36 to receive modem status information resident to modem 36 and dispatch modem control information thereto.

Connection monitor 40 further presents to a user of host system 34 the diagnostic status and control information as queried by the user. Such a concurrent execution of both communication application 38 and connection monitor 40 facilitates current real time status information relating to such quality indicators as the signal quality, the present connect rate and error rates and other status conditions pertinent to the present open connection. In the present invention, the concurrent operation of both communication application 38 and connection monitor 40 injects negligible degradation to system performance to data information passing through the open channel. Such status information is especially useful to wireless communication channels as such information enables a user to diagnose throughput problems such as diminished bandwidth capabilities or high error rates inherent to wireless communication channels.

Additionally such status information is also valuable for wired or landline communication channels particularly as transfer speeds increase. For example, host system 34, coupled via modem 36 to a landline communication channel, may experience performance less than desirable. Connection monitor 40 may consult with modem 36 to deduce or establish a reduced data transfer rate as negotiated by the remote modem. Furthermore, modern communication protocols also facilitate the renegotiation of data transfer rates during a communication session. Such a renegotiation of a data transfer rate typically is transparent to a user with the user only being privy to the initial perception of the reduced data transfer rate. In the present invention, connection monitor 40 may query modem 36 while the communication application maintains an open connection to determine the change in the data transfer rate allowing a user to react accordingly.

Figure 3:
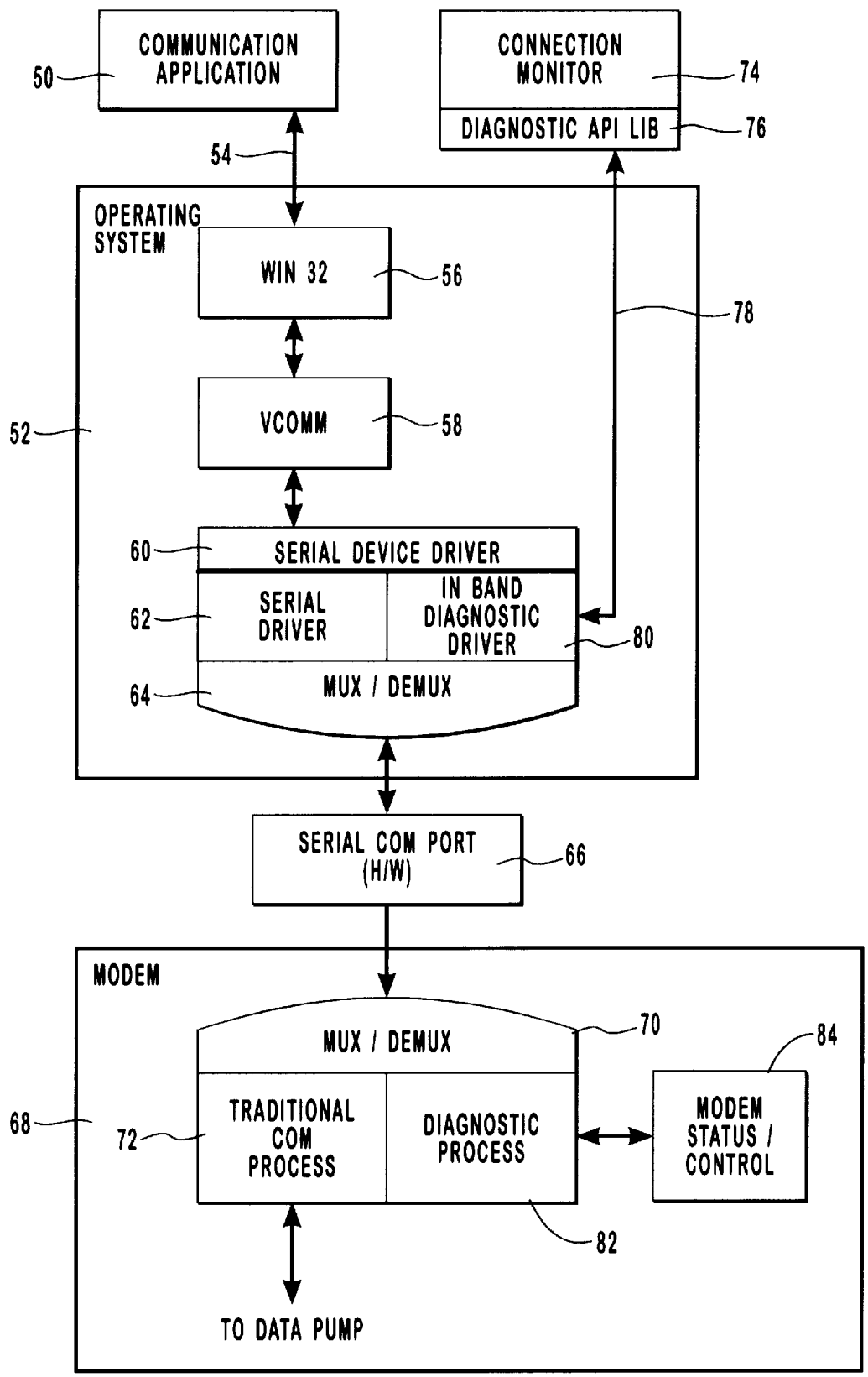
FIG. 3 is a simplified block diagram of the architecture for concurrently accommodating a communication application and a connection monitor for directly communicating with a modem, in accordance with the preferred embodiment of the present invention.

FIG. 3 depicts a simplified block diagram of a connection monitor concurrently interacting with a modem during an open connection controlled by a communication application without terminating the open connection, in accordance with the preferred embodiment of the present invention. The present example employs the Windows 95® operating system as developed by Microsoft®. In such an embodiment, communication application 50 issues an API 54 to a Win 32 process 56 for interpretation. Operating system 52 further employs a virtual communication driver which provides protected-mode communication services for Windows-based applications including Win 32 applications. In FIG. 3, the virtual communication driver is illustrated as VCOMM 58. Virtual device driver VCOMM 58 communicates with a serial device driver 60 which is capable of interacting with a serial COM port 66 to provide a hardware interface to a modem 68.

Serial device driver 60 may co-exist with other original Windows 95 serial device drivers by utilizing the registry function of operating system 52 to denote serial device driver 60 as the preferred device driver for modem 68. Serial device driver 60 is comprised of a serial driver 62 through which a connection is opened and maintained and through which data information passes between communication application 50 and modem 68. Serial driver 62 provides the communication components that provide base-level access with serial com port 66 and VCOMM 58.

The open connection then continues through serial com port 66 which provides the interface with the software associated with operating system 52 and the hardware necessary for transmitting and receiving information with modem 68. Serial com port 66 is coupled with modem 68 over an interface channel generally taking the form of an asynchronous or RS-232 interface. Modem 68 is comprised of processing elements for evaluating the data received from serial com port 66 and for evaluating data received from the data pump portion (not shown) of modem 68. To facilitate such an open connection, a traditional communication process 72 provides the interface between serial com port 66 and the data pump.

When a channel is opened, modem 68 tracks and stores modem status control information 84 specifying status information retained by modem 68, such as line quality information, eye log values for wireline communication channels, block errors associated with received errors, throughput or data transfer rate, and other various information including bit error rates and present connect rates undergoing retraining procedures. As briefly described above, such status information is highly valuable to a user of a host system in enabling such a user to diagnose communication situations such as when data transfer rates fall below requested levels.

To facilitate the extraction of such diagnostic status information, a connection monitor 74 coupled to a diagnostic API library 76 provides a collateral or separate interface with operating system 52. Connection monitor 74 communicates with operating system 52 by employing a separate custom API which may also be referred to as a diagnostic API or alternatively, a side-door API which allows a connection monitor to access information from modem 68 while a connection is open. In such an exemplary embodiment, connection monitor 74 issues a diagnostic API call 78 to serial device driver 60. In such an embodiment, serial driver 60 is further comprised of an inband command processor or diagnostic driver 80. Connection monitor 74 issues a virtual device driver API illustrated as diagnostic API call 78. In the present embodiment employing Windows 95 as operating system 52, inband diagnostic driver 80 deciphers diagnostic API 78 call which is comprised of a device I/O control call which, in the preferred embodiment, is passed down to a transport layer to be encoded in such a manner as to be discernable from other data information by modem 68. The preferred method for encoding includes the use of a V.80 encoding as briefly shown in FIG. 4.

Figure 4:
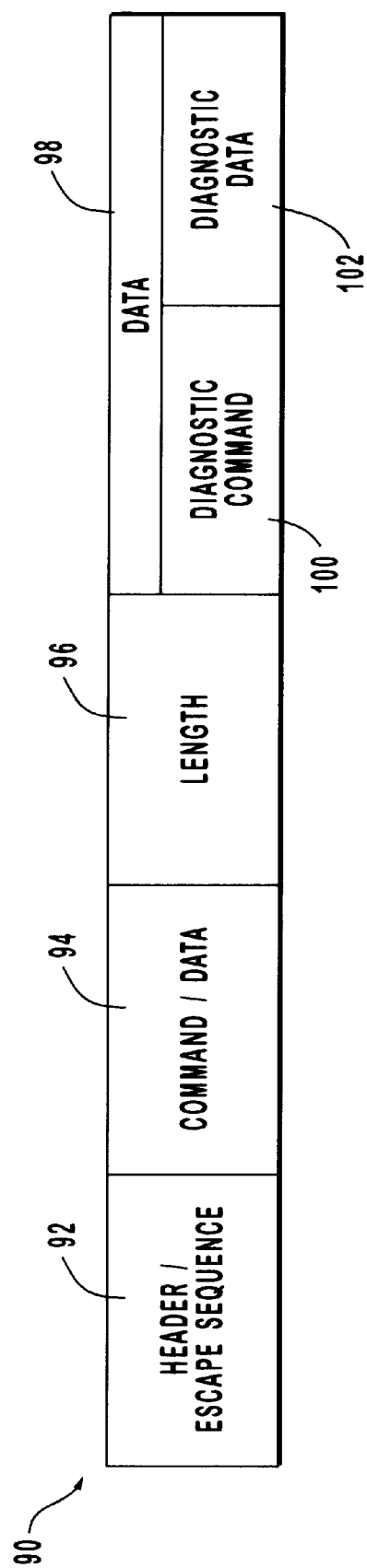
FIG. 4 depicts a command/status structure for communicating with a modem having an open connection, in accordance with a preferred embodiment of the present invention.

Now referring to FIG. 4, data as originally generating by connection monitor 74 (FIG. 3) takes the form of data 98 which may be comprised of a diagnostic command 100 and optionally diagnostic data 102. Such a data structure is further packaged by including a length parameter 96 and a command parameter 94. A header 92 parameter is further appended to provide an escape sequence or other sequence recognizable by modem 98 for discerning the presence of a diagnostic command as opposed to data information passing between communication application 50 and modem 68.

Serial device driver 60 is further comprised of a multiplexing and demultiplexing process 64 which, when transmitting information from operating system 52 to serial com port 66, multiplexes the data information passing through serial driver 62 and diagnostic command information passing through inband diagnostic driver 80 into the open connection without disturbing the general throughput nor requiring modem 68 to toggle between communication processing modes and AT command modes or other initialization modes. Multiplexer and demultiplexer process 64 interleaves a diagnostic command into the general data stream.

Serial com port 66 passes both the data information as received from serial driver 62 and connection monitor commands as received from inband diagnostic driver 80 without discriminating between either of the two types of information. Modem 68, upon receiving the information through the open connection, passes such information through a demultiplex and multiplexer process 70 to partition the data information into the corresponding processes.

For example, data information passing between communication application 50 and the data pump passes through a traditional communication process 72 when routed thereto from demultiplexer and multiplexer process 70. Furthermore, connection monitor commands that were coded in the inband diagnostic driver 80 to comprise a unique header discernable by demultiplexer and multiplexer process 70 is separated by process 70 with the connection monitor commands being routed through diagnostic process 82. Diagnostic process 82 queries modem status/control 84 to obtain the requested information. Diagnostic process 82 then decodes the encoded message which, in the preferred embodiment was encoded using escape sequences as described in FIG. 4.

It should be further pointed out that for information traversing from modem 68 to connection monitor 74, demultiplexer and multiplexer 70 operate as a multiplexer for integrating a diagnostic response into the open channel including the appropriate encoding information for unique extraction by serial device driver 60, and more particularly, at inband diagnostic driver 80 as demultiplexed by multiplexer and demultiplexer process 64.

Figure 5:
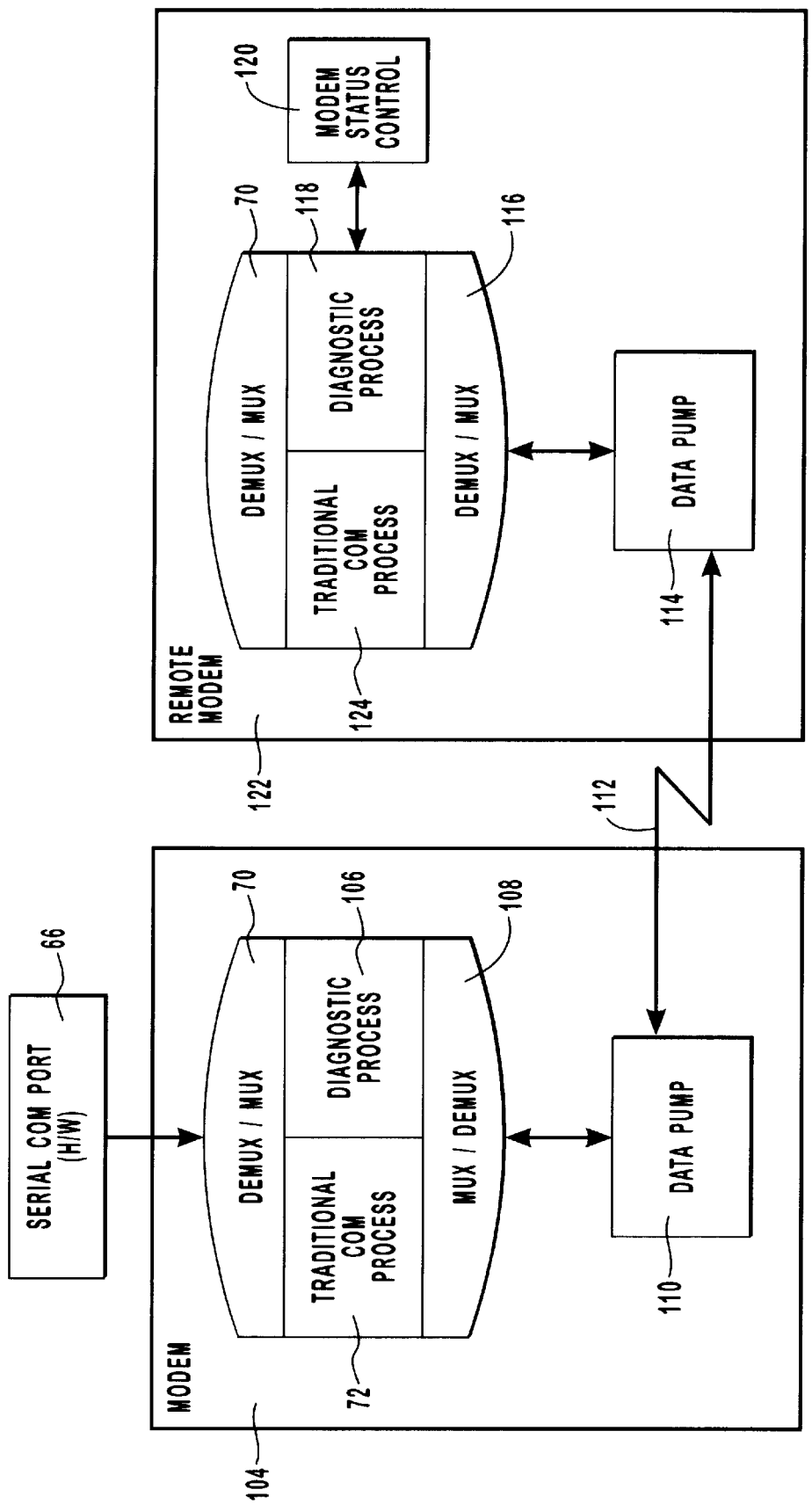
FIG 5 is a portion of a simplified block diagram enabling the remote access of diagnostic information from a remote modem, in accordance with a preferred embodiment of the present invention.

FIG. 5 is a simplified block diagram of an alternate embodiment for a connection monitor to concurrently interact with a modem during an open connection controlled by a communication application for retrieving diagnostic information from a remote modem. In FIG. 5, the operating system and serial device driver takes the form of those previously described in FIG. 3. That is to say, a connection monitor issues a diagnostic API call to get to a serial device driver which in turn multiplexes such a diagnostic command into the open channel established by the communication application. Data information and connection monitor commands are then passed directly to serial COMM port 66 for dispatch to a modem 104. Modem 104 is comprised of a demultiplex and multiplex process 70 which evaluates the information passing through the open channel and routes data information to a traditional COM process 72 and using inband signalling as described in FIG. 3 to establish an escape sequence or other descriptive sequence discernable by demultiplexer and multiplexer 70. The designated diagnostic command is then routed to a diagnostic process 106 for evaluation.

In the present embodiment, diagnostic process 106 recognizes that the specific command designated by the diagnostic command requests the status of a remote modem as opposed to the immediate modem. Diagnostic process 106 thereafter may either directly pass the diagnostic command to a multiplexer and demultiplexer 108 or alternatively may repackage the diagnostic command into a format for inline or inband discernment. Multiplexer and demultiplexer 108 then receives data information from traditional COM process 72 and diagnostic process 106 for transfer across the open channel via a data pump 110. Data pump 110 transfers the data via a communication channel 112 to data pump 114 of remote modem 122.

Remote modem 122 is similarly configured with a demultiplexer and multiplexer 116 for evaluating information passing over the open connection to discern traditional data information and pass such information to a local traditional COM process 124 or pass connection monitor commands to a diagnostic process 118. Diagnostic process 118 thereafter unpackages and evaluates the requested command and accesses modem status and control information 120 as requested in the diagnostic command. Diagnostic process 118 thereafter packages modem status and control information and demultiplexer and multiplexer 116 integrates the diagnostic information into the open connection for routing back through the data pumps to the host system having the requesting connection monitor thereon.

Figure 6A:
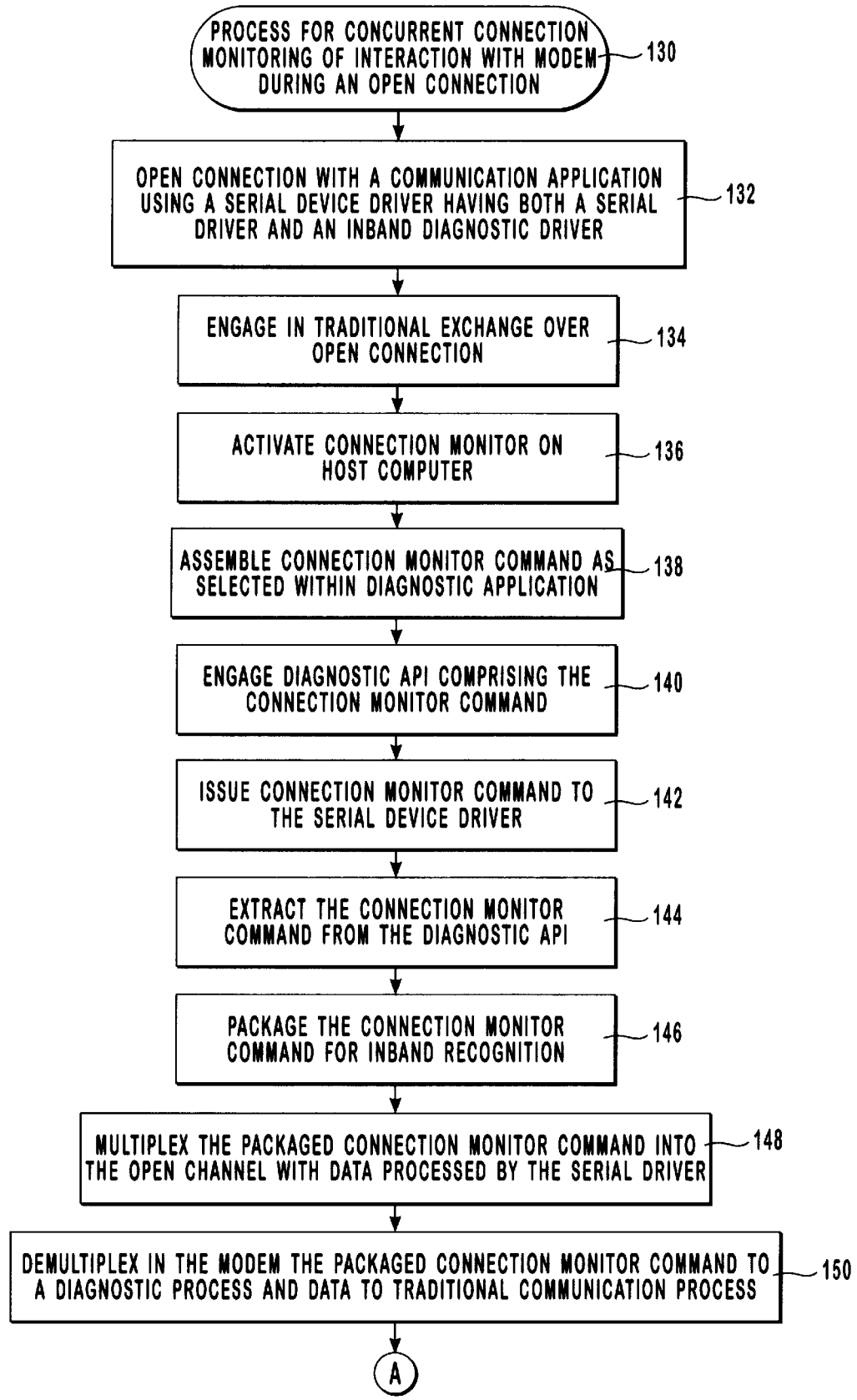
FIGS. 6A–C depict a flowchart of a process for concurrent diagnostic interaction a modem during an open connection, in accordance with preferred embodiments of the present invention.
Figure 6B:
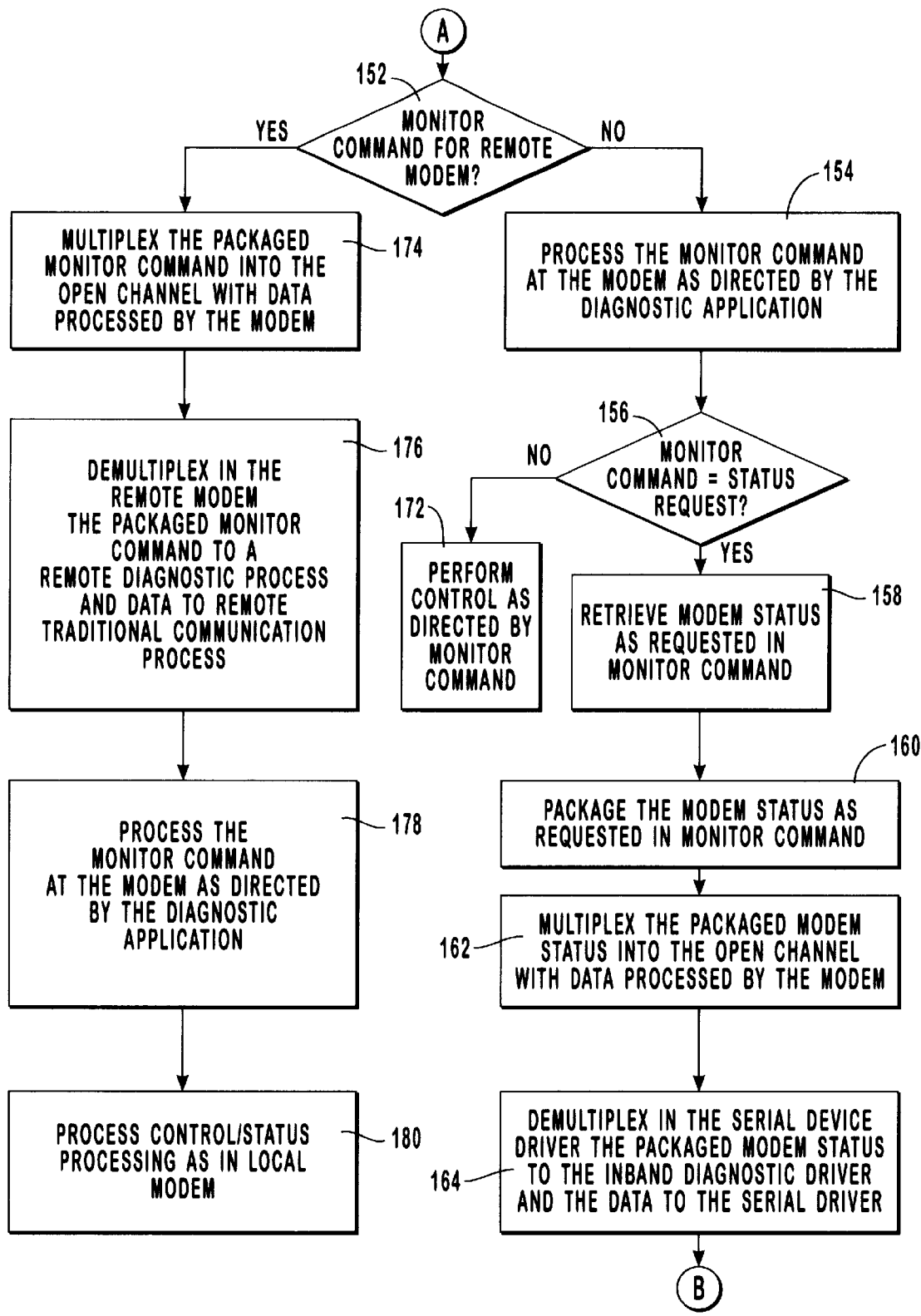
Figure 6C:
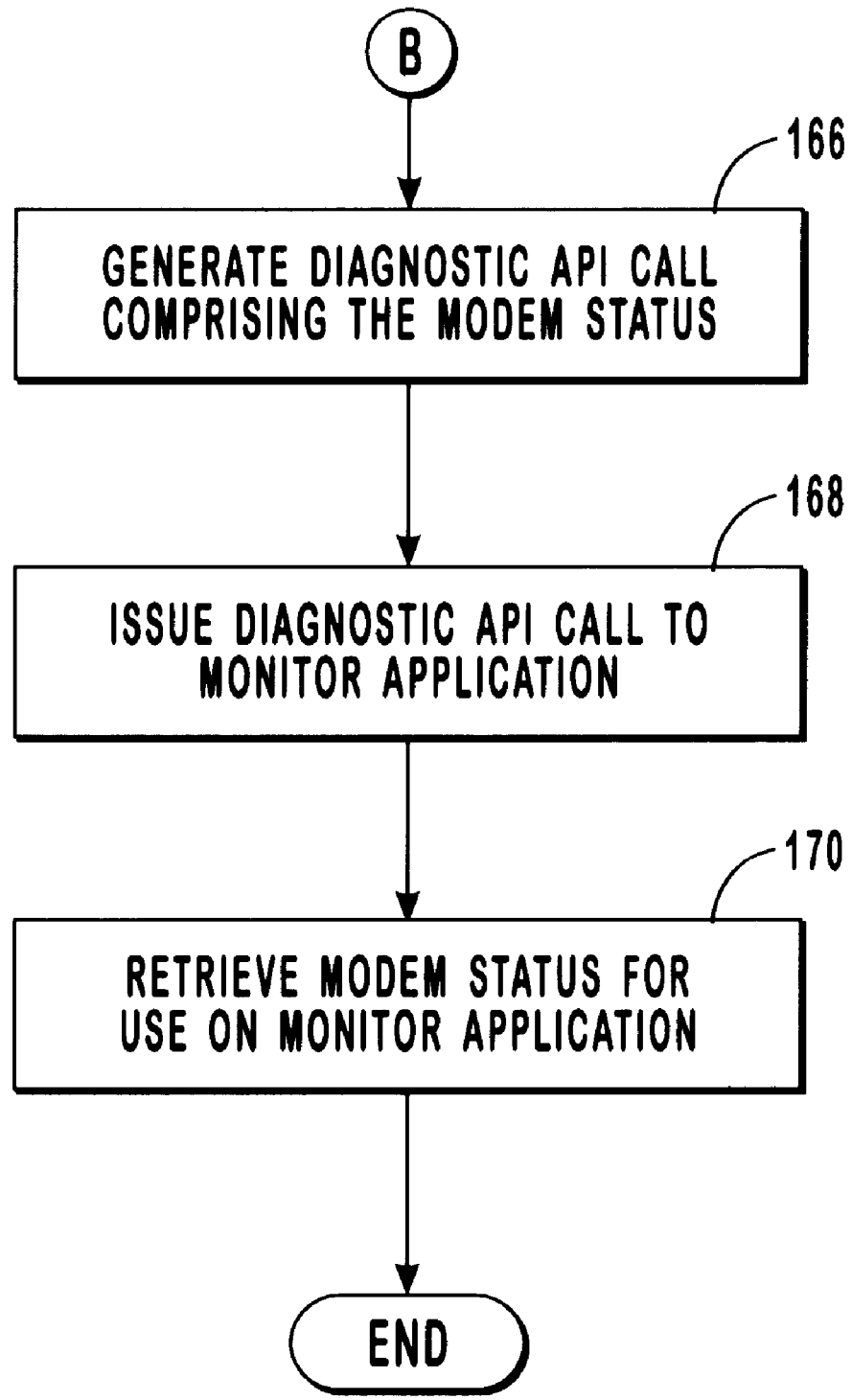

FIG. 6 is a flowchart of a process for concurrent diagnostic interaction with a modem during an open connection, in accordance with the preferred embodiment of the present invention. As described above, process 130 enables a user of a host system to concurrently interrogate a modem for status information and dispatch control information to the modem while a connection with the modem is open and remains open throughout the diagnostic query.

In process 130, a task 132 opens a connection between a host system and a modem using a communication application. The connection is opened via a serial device driver which incorporates both a serial driver for processing communication information and an inband diagnostic driver for processing connection monitor commands. In the present invention, the serial device driver may coexist with standard device drivers inside of an operating system by pointing the registry at the serial device driver of the present invention when a modem having like capability is also utilized for establishing the open connection. The serial device driver presents two types of entry to the operating system, one for normal communications and one for a collateral or side-door entrance from a connection monitor. The serial device driver provides the bridge, in the exemplary embodiment, between security rings associated with the operating system such as ring 3 and ring 0.

A task 134 engages in traditional communication processing or data exchange via the aforementioned serial driver within the serial device driver. As described above, standard device drivers only accommodate multiple points of entry but only one point of entry to the modem thereby facilitating interaction only with the communication application and requiring a channel to either be closed or a communication application to alter the mode of operation of the modem thus significantly impacting the data transfer throughput associated with a communication channel.

A task 136 activates the connection monitor on the host computer system. The connection monitor operates via the operating system to interact with the modem in accordance with the present invention. The connection monitor, in the present invention, is a separate autonomous application running within the operating system environment. That is to say, the connection monitor is not closely related to the communication application, nor is the connection monitor integrated within the communication application, however, such an embodiment is contemplated within the scope of the present invention wherein a serial device driver may facilitate multiple entry points. The connection monitor, in a task 138, assembles a diagnostic command as selected by a user of the host system interacting with the connection monitor. A user of the connection monitor may request on-going status information to periodically be presented in a Window or other interactive interface associated with the connection monitor.

A task 140 generates a diagnostic API call which allows the connection monitor the ability to access information from the modem while the connection is open. While the present invention contemplates a diagnostic API for interrogating a modem, such a serial device driver capable of receiving a collateral API is not limited to interrogation of modems and can be applied to other devices such as local area network devices. Furthermore, such a serial device driver facilitates a connection monitor in accessing a device such as modem while other applications such as the communication application are conversing with the serial COMM port.

Additionally, the connection monitor referred to in FIG. 3 also is comprised of a diagnostic API library which facilitates portability between generational operating systems or unrelated operating systems having divergent API formats and abstract low level function calls from the average programmer.

A task 104 generates a diagnostic API comprising the selected diagnostic command from the connection monitor. A task 142 issues the diagnostic API to initialize the diagnostic connection to obtain the handle or pointer to the inband diagnostic portion of the serial device driver. In the exemplary operating system, Windows 95, of the present embodiment, the diagnostic API is then able to make direct calls using the handle to the virtual device driver or serial device driver by employing IO control calls such as the IOCTL calls within the operating system environment.

The serial device driver, in a task 144 evaluates the diagnostic command received from the diagnostic API. The evaluation performed by the inband diagnostic driver may be minimal or exhaustive depending upon the level of sophistication incorporated within a particular inband diagnostic driver. The inband diagnostic driver at a minimum performs a task 146 wherein the diagnostic command is packaged within a frame structure capable of being discerned as diagnostic command information by the modem. The preferred embodiment employs an inband signalling protocol for packaging the diagnostic command. The inband protocol is depicted above in FIG. 4 and primarily utilizes a recognizable header followed by payload information which incorporates the diagnostic command.

A task 148 multiplexes the packaged diagnostic command into the open channel that the data processed by the serial driver for delivery to the serial COM port. The serial COM port then processes all the received information by providing the bridge between the software environment of the operating system to a hardware transmission interface to the modem. The modem executes a task 150 wherein the information received through the open connection is demultiplexed to form a stream of data information for processing by a traditional communication process and a stream of information comprised of packaged connection monitor commands for processing by a diagnostic process. In demultiplexing task 150, the packaging performed prior, wherein the inband connection monitor commands are uniquely packaged for recognition by the demultiplexing process of the modem is unwrapped to expose the diagnostic command.

The modem performs a query task 152, in an alternate embodiment, to determine the ultimate destination for the diagnostic command. When the diagnostic command is determined to be performed within the present modem as opposed to a remote modem, a task 154 processes the diagnostic command according to the selected command designated by the connection monitor. In evaluating the diagnostic command, a query task 156 determines whether the diagnostic command is a status request or a control command. When the diagnostic command takes the form of a status request, a task 158 retrieves the modem status as requested in the diagnostic command. Such status requests may also have additional granularity in requesting with additional specificity definite status components.

Types of status information available to a connection monitor are largely a factor of the amount of sophistication incorporated within the modem for storing and interfacing with sophisticated equipments. For example, in a landline or wired communication channel linking the host system with a remote modem, common status information may include current transmit and receive connection rates, number of modem retrains, current transmit and receive throughput rate, line quality indicator, transmission errors, transmit power level, modulation type, compression protocol, error protocol and amount of compression achieved relative to requested throughput, among others. Furthermore, when a modem is connected via a wireless communication channel status parameters may include landline values as described above, cellular channel being employed, receive signal strength indicator (RSSI), RF transmit frequency and RF receive frequency, among others.

Additionally, in more sophisticated wireless communication channels such as a CDPD configuration, status indicators may take the form of signal strength, IP address, packets sent and received, roaming status, control channel frequency, channel scanning status, receive signal strength indicator (RSSI), service provider network identifier (SPNI), wide area service identifier, service provider identifier, registration return code, cell number, block error rate, packet success rate, number of failed packets, temporary equipment identifier (TEI), receive block success rate, transmit block success rate, maximum blocks, maximum backoff, maximum entrance delay, maximum transmission attempts, minimum backoff, minimum idle time, coverage indicator and time out of coverage area, among others.

A task 160 packages the modem status for inband recognition on a return path up to the connection monitor. Such processing performed by the diagnostic process takes a similar form as that previously performed on the diagnostic command, that is to say, the status information is packaged into a recognizable frame for inband transmission between the modem and the host system. A task 164 is performed within the operating system in the serial device driver wherein the received information over the open channel is demultiplexed into the serial device driver with the package modem status being processed by the inband diagnostic driver and other data information being processed by the serial driver of the serial device driver.

In a task 166, the inband diagnostic driver generates a diagnostic API which is comprised of the modem status as extracted from the target modem. The generated diagnostic API is issued by a task 168 to the connection monitor for processing therein. The connection monitor performs a task 170 and retrieves the modem status from the diagnostic API for use by the connection monitor in presenting or evaluating the receive status information.

When query task 152 determines that the diagnostic command is targeted for a remote modem, a task 174 multiplexes the packaged diagnostic command into the open channel with the data processed by the modem. The diagnostic process may pass the packaged diagnostic command in its state as received from the serial device driver after evaluating the command or may repackage the diagnostic command into another format prior to multiplexing the information into the data stream transferred across the communication channel.

At the remote modem, a task 176 demultiplexes the received information into traditional communication processing for the processing of data information and into a diagnostic process for processing the received remote diagnostic command. In a task 178 the remote diagnostic command is processed by the remote modem as originally directed by the connection monitor. A task 180 processes the remote diagnostic command by extracting the appropriate status information or initiating control information to the remote modem as originally directed by the connection monitor operating on the host system. When the remote diagnostic command takes the form of a status request, packaging and processing of the status information and routing of the information back through the communication channel takes the reverse processing path as taken by the remote diagnostic command.

A method and system for a connection monitor to concurrently interact with a concurrent diagnostic-capable modem during an open connection controlled by a communication application without terminating the open connection of the concurrent diagnostic-capable modem has been described. Furthermore, the steps of generating and routing a diagnostic command through an open connection to a modem capable of evaluating and processing such a diagnostic command has been described in detail. Such methods and processes may be carried out using appropriate and corresponding software modules capable of executing the aforementioned tasks and processes.

The present invention may be embodied in other specific forms without departing from the spirit or essential characteristics. The described embodiments are to be considered in all respects only illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for a connection monitor to interact with a concurrent diagnostic-capable modem during an open connection controlled by a communication application without terminating said open connection of said concurrent diagnostic-capable modem, said method comprising the steps of:

a) selecting a serial device driver having both a serial driver and an inband diagnostic driver from among at least one other device driver when said concurrent diagnostic-capable modem is interfaced with said communication application;

b) generating a diagnostic command as determined by said connection monitor;

c) issuing a diagnostic API call comprised of said diagnostic command to said serial device driver having both a serial driver and an inband diagnostic driver;

d) extracting at said inband diagnostic driver said diagnostic command from said diagnostic API;

e) multiplexing at said serial device driver said diagnostic command and data passing through said serial driver into said open connection;

f) demultiplexing at said modem said diagnostic command to a diagnostic process and said data to a traditional communication process; and g) processing said diagnostic command at said concurrent diagnostic-capable modem as directed by said connection monitor.

2. The method for a connection monitor to interact with a concurrent diagnostic-capable modem during an open connection, as recited in claim 1, wherein said generating a diagnostic command step comprises the step of generating a diagnostic status request as said diagnostic command.

3. The method for a connection monitor to interact with a concurrent diagnostic-capable modem during an open connection, as recited in claim 2, wherein said processing said diagnostic command at said concurrent diagnostic-capable modem comprises the steps of:

a) retrieving modem status as requested by said connection monitor;
b) packaging said modem status into packaged modem status for inband recognition by said serial device driver;
c) multiplexing at said concurrent diagnostic-capable modem said packaged modem status with received data into said open connection;
d) demultiplexing at said serial device driver said packaged modem status to said inband diagnostic driver and said received data into said serial driver; and
e) issuing a diagnostic response API call comprised of said modem status to said connection monitor.

4. The method for a connection monitor to interact with a concurrent diagnostic-capable modem during an open connection, as recited in claim 1, wherein said multiplexing step further comprises the step of packaging said diagnostic command to facilitate inband identification of said diagnostic command by said concurrent diagnostic-capable modem.

5. The method for a connection monitor to interact with a concurrent diagnostic-capable modem during an open connection, as recited in claim 4, wherein said packaging step further comprises the step of employing an inband signalling mechanism such as a V.80 protocol-like standard having an escape sequence identifiable by said concurrent diagnostic-capable modem.

6. The method for a connection monitor to interact with a concurrent diagnostic-capable modem during an open connection, as recited in claim 1, wherein when said diagnostic command is targeted for a remote concurrent diagnostic-capable modem, said processing step comprising the steps of:
a) multiplexing said diagnostic command into said open connection with transmit data to deliver to said remote concurrent diagnostic-capable modem;
b) demultiplexing at said remote concurrent diagnostic-capable modem said diagnostic command to a remote diagnostic process and said transmit data to a remote traditional communication process; and
c) processing said diagnostic command at said remote concurrent diagnostic-capable modem as directed by said connection monitor.

7. A method for a serial device driver to facilitate a connection monitor application to concurrently interact with a concurrent diagnostic-capable modem during an open connection controlled by a communication application without terminating said open connection of said concurrent diagnostic-capable modem, said method comprising the steps of:
a) receiving at an inband diagnostic driver of said serial device driver a diagnostic API call comprised of a diagnostic command originating from said connection monitor application, said serial device driver comprising both a serial driver to process data passing between said communication application and said concurrent diagnostic-capable modem and said inband diagnostic driver to process said diagnostic command passing between said connection monitor application and said concurrent diagnostic-capable modem;
b) extracting at said inband diagnostic driver said diagnostic command from said diagnostic API; and
c) multiplexing at said serial device driver said diagnostic command and said data passing through said serial driver into said open connection to be demultiplexed at said concurrent diagnostic-capable modem wherein said diagnostic command is processed by said concurrent diagnostic-capable modem as directed by said connection monitor application.

8. The method for a serial device driver to facilitate a connection monitor application to concurrently interact with a concurrent diagnostic-capable modem during an open connection, as recited in claim 7, wherein when said diagnostic command is a diagnostic status request, said method further comprising the steps of:
a) demultiplexing as said serial device driver a packaged modem status as generated by said concurrent diagnostic-capable modem to said inband diagnostic driver and receive data into said serial driver; and
b) issuing a diagnostic response API call comprised of said modem status to said connection monitor application.

9. The method for a serial device driver to facilitate a connection monitor application to concurrently interact with a concurrent diagnostic-capable modem during an open connection, as recited in claim 7, wherein said multiplexing step further comprises the step of packaging said diagnostic command to facilitate inband identification of said diagnostic command by said concurrent diagnostic-capable modem.

10. The method for a serial device driver to facilitate a connection monitor application to concurrently interact with a concurrent diagnostic-capable modem during an open connection, as recited in claim 9, wherein said packaging step further comprises the step of employing an inband signalling technique such as a V.80 protocol-like standard having an escape sequence identifiable by said concurrent diagnostic-capable modem.

11. A computer-readable medium having computer-executable instructions for performing a method for a serial device driver to facilitate a connection monitor application to concurrently interact with a concurrent diagnostic-capable modem during an open connection controlled by a communication application without terminating said open connection of said concurrent diagnostic-capable modem, said computer-executable instructions for performing the steps comprising:
a ) receiving at an inband diagnostic driver of said serial device driver a diagnostic API comprised of a diagnostic command originating from said connection monitor application, said serial device driver comprising both a serial driver to process data passing between said communication application and said concurrent diagnostic-capable modem and said inband diagnostic driver to process said diagnostic command passing between said connection monitor application and said concurrent diagnostic-capable modem;
b) extracting at said inband diagnostic driver said diagnostic command and said diagnostic API; and
c) multiplexing at said serial device driver said diagnostic command and said data passing through said serial driver into said open connection to be demultiplexed at said concurrent diagnostic-capable modem wherein said diagnostic command is processed by said concurrent diagnostic-capable modem as directed by said connection monitor application.

12. The computer-readable medium of claim 11 wherein said diagnostic command is a diagnostic status request and further comprises computer-executable instructions for performing the steps of:
a) demultiplexing as said serial device driver a packaged modem status as generated by said concurrent diagnostic-capable modem to said inband diagnostic driver and receive data into said serial driver; and b) issuing a diagnostic response API call comprised of said modem status to said connection monitor application.

13. The computer-readable medium of claim 11 wherein said multiplexing instructions further comprise computer-executable instructions for performing the step of packaging said diagnostic command to facilitate inband identification of said diagnostic command by said concurrent diagnostic-capable modem.

14. A method in a modem to facilitate a connection monitor application operably residing on a host system to concurrently interact with said modem during an open connection controlled by a communication application without terminating said open connection of said modem, said method comprising the steps of:
   a) receiving at said modem via said open connection both data and a diagnostic command originating from said connection monitor application;
   b) demultiplexing said diagnostic command to a diagnostic process and said data to a traditional communication process; and
   c) processing said diagnostic command at said modem as directed by said connection monitor application.

15. The method in a modem to facilitate a connection monitor to concurrently interact with said modem during an open connection, as recited in claim 14, wherein said processing said diagnostic command at said modem when said diagnostic command is a diagnostic status request step comprises the steps of:
   a) retrieving modem status as requested by said connection monitor application;
   b) packaging said modem status into packaged modem status for inband recognition by said host system; and
   c) multiplexing at said modem said packaged modem status with received data into said open connection for demultiplexing at said host system.

16. The method in a modem to facilitate a connection monitor to concurrently interact with said modem during an open connection, as recited in claim 15, wherein said multiplexing step further comprises the step of packaging said diagnostic command to facilitate inband identification of said diagnostic command by said host system.

17. A computer-readable medium having computer-executable instructions for performing a method in a modem to facilitate a connection monitor application operably residing on a host system to concurrently interact with said modem during an open connection controlled by a communication application without terminating said open connection with said modem, said computer-executable instructions for performing the steps comprising:
   a) receiving at said modem via said open connection both data and a diagnostic command originating from said connection monitor application;
   b) demultiplexing said diagnostic command to a diagnostic process and said data to a traditional communication process; and
   c) processing said diagnostic command at said modem as directed by said connection monitor application.

18. The computer-readable medium of claim 17 wherein said instructions for performing the step of processing said diagnostic command at said modem when said diagnostic command is a diagnostic status request comprises computer-executable instructions for performing the steps of:
   a) retrieving modem status as requested by said connection monitor application;
   b) packaging said modem status into packaged modem status for inband recognition by said host system; and
   c) multiplexing at said modem said packaged modem status with received data into said open connection for demultiplexing at said host system.

19. The computer-readable medium of claim 18 wherein said instructions for performing the step of multiplexing further comprises computer-executable instructions for performing the step of packaging said diagnostic command to facilitate inband identification of said diagnostic command by said host system.

* * * * *

UNITED STATES PATENT AND TRADEMARK OFFICE
CERTIFICATE OF CORRECTION

PATENT NO.   : 6,161,201
DATED        : December 12, 2000
INVENTOR(S)  : Craig Payne; Jennifer Baker; Philip C. Garner; Carl Ketcham; John Major Page 1 of 1

It is certified that error appears in the above-identified patent and that said Letters Patent is hereby corrected as shown below:

Column 3,
Line 39, after "enable a user to" change "electically" to -- eclectically --

Column 6,
Line 47, after "diagnostic interaction" insert -- with --

Column 9,
Line 45, after "recognizable by modem" change "98" to -- 68 --

Column 21,
Line 7, after "A task" change "104" to -- 140 --

Column 16,
Line 52, after "command" change "and" to -- from --

Signed and Sealed this

Nineteenth Day of March, 2002

*Attest:*

*Attesting Officer*

JAMES E. ROGAN
*Director of the United States Patent and Trademark Office*